(12) United States Patent
Hernacki

(10) Patent No.: US 7,620,988 B1
(45) Date of Patent: Nov. 17, 2009

(54) PROTOCOL IDENTIFICATION BY HEURISTIC CONTENT ANALYSIS

(75) Inventor: Brian Hernacki, San Carlos, CA (US)

(73) Assignee: Symantec Corporation, Cupertino, CA (US)

( * ) Notice: Subject to any disclaimer, the term of this patent is extended or adjusted under 35 U.S.C. 154(b) by 743 days.

(21) Appl. No.: 10/628,006

(22) Filed: Jul. 25, 2003

(51) Int. Cl.
*G06F 21/00* (2006.01)
(52) U.S. Cl. .............. 726/23; 726/11; 726/14; 726/25; 713/152; 713/154
(58) Field of Classification Search ............ 726/11, 726/12, 13, 23, 25, 14; 713/152, 154
See application file for complete search history.

(56) References Cited

U.S. PATENT DOCUMENTS

| | | | |
|---|---|---|---|
| 6,499,107 B1 * | 12/2002 | Gleichauf et al. ............ 726/23 |
| 7,134,143 B2 * | 11/2006 | Stellenberg et al. .......... 726/25 |
| 2003/0004688 A1 * | 1/2003 | Gupta et al. ................ 702/188 |
| 2003/0051026 A1 * | 3/2003 | Carter et al. ................ 709/224 |
| 2004/0174820 A1 * | 9/2004 | Ricciulli ...................... 370/245 |

* cited by examiner

*Primary Examiner*—Matthew B Smithers
*Assistant Examiner*—Paul Callahan
(74) *Attorney, Agent, or Firm*—Hunton & Williams LLP

(57) ABSTRACT

A system and method are disclosed for providing network traffic identification. In one embodiment, the method comprises receiving pattern matching data; comparing the pattern matching data with a pattern; and determining whether the pattern matching data matches the pattern. In one embodiment, the system comprises an interface configured to receive pattern matching data and a processor configured to: compare the pattern matching data with a pattern and determine whether the pattern matching data matches the pattern.

39 Claims, 6 Drawing Sheets

PROTOCOL IDENTIFICATION BY HEURISTIC CONTENT ANALYSIS

FIELD OF THE INVENTION

The present invention relates generally to computer network security. More specifically, a system and method for protocol identification is disclosed.

BACKGROUND OF THE INVENTION

Network security is an important issue in modern computer networks. Technologies such as intrusion detection systems (IDSs) and firewalls are used extensively to protect computing resources on the network from unauthorized activities.

IDSs and firewalls are typically configured with a set of policies. These systems make decisions regarding controlling, monitoring and other related network administration activities based on the policies. In order to apply the policies, it is desirable to identify the type of network traffic. There are conventions that specify the mapping of application protocols to ports. Existing systems generally rely on this convention and use simple port characteristics to determine the types of network traffic going through the system. For example, the destination port for all HTTP traffic is typically port 80. A firewall configured to allow HTTP traffic identifies all network packets destined for port 80 as HTTP traffic, and allows them to pass through. A potential problem with this approach is that it does not take into consideration the application data of the packet. The application data of the packet may contain data for an application that is normally disallowed by the firewall; however, because the packet is destined for an allowed port, it typically bypasses firewall detection.

Using an allowed port to send disallowed traffic and avoid firewall detection (also referred to as "tunneling") is easy to accomplish yet difficult to detect. Many applications such as instant messaging and peer-to-peer file sharing include built-in port scanning functions to detect ports allowed by the firewall, and use those ports to tunnel traffic that may be forbidden by the firewall. Tunneling also poses a threat to IDSs, which commonly rely on port mapping to determine the application of signatures. A packet destined for an allowed port containing disallowed traffic is typically either ignored, leading to no detection; or has incorrect signatures applied to it, leading to high rate of false negatives.

Problems also arise when services run on non-standard ports. The default behavior of most firewall systems is to disallow the traffic. For example, if a firewall is configured to allow HTTP traffic on port 80 only, traffic destined for a target server that runs its HTTP service on port 8080 is dropped and the user loses service. To provide users full service on non-standard ports requires opening more ports on the firewall, which increases the security risk. Services on non-standard ports are also problematic for IDSs. Since the traffic cannot be mapped to a specific protocol, the IDSs usually default to detecting everything or nothing at all. If the IDS attempts to detect everything, it tends to consume a lot of system resources (computing cycles, memory, etc) and increase the number of false positives. On the other hand, if the IDS detects nothing at all, any potential threat to the system would go undetected.

It would be desirable to have a system and method that could identify protocols without relying on the port mapping conventions. It would be useful if the technique could improve the accuracy of policy decisions without incurring significant system overhead. The present invention addresses such needs.

BRIEF DESCRIPTION OF THE DRAWINGS

The present invention will be readily understood b) the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

An improved system and method for identifying network traffic are disclosed. In an embodiment of the present invention, pattern matching techniques are used to determine properties associated with the network traffic, such as the application protocol. A pattern matching engine can be used to examine the pattern matching data selected from a data packet. In some embodiments, the pattern matching engine compares the pattern matching data with one or more patterns to determine whether the packet has a certain property. In some embodiments, the pattern matching engine concatenates the pattern matching data from multiple data packets and compares the concatenated data to patterns available to the pattern matching engine.

Figure 1:
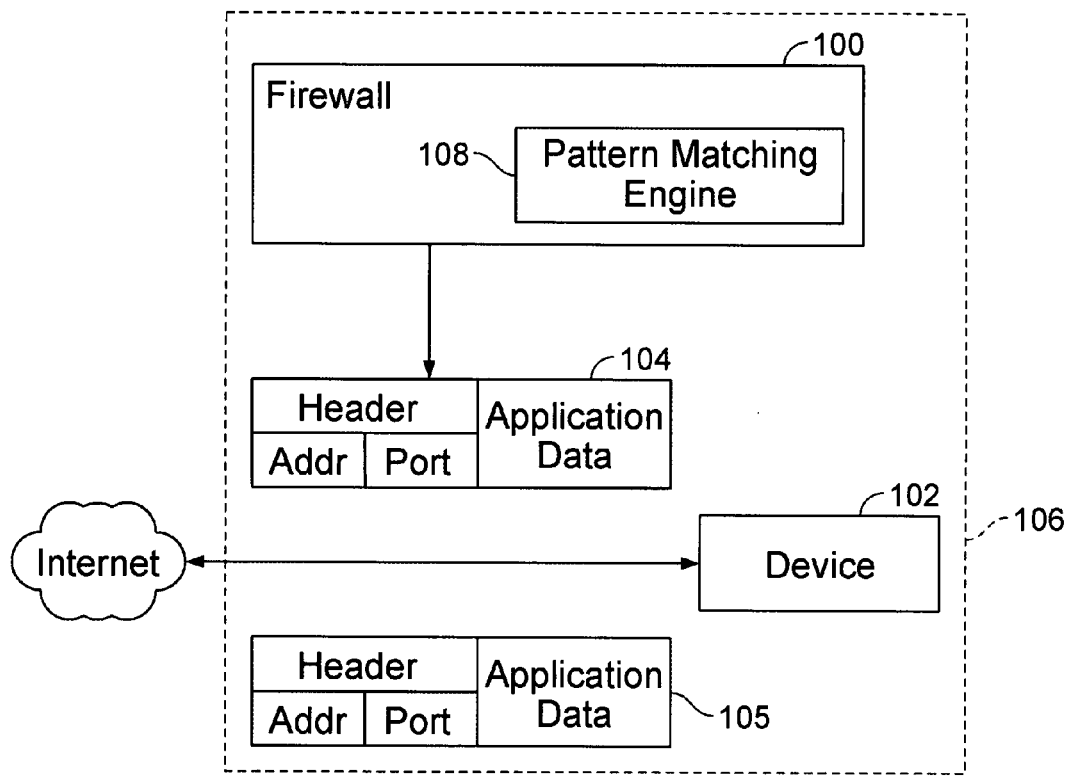
FIG. 1 is a system diagram illustrating a system that is protected by a firewall according to an embodiment of the present invention.

FIG. 1 is a system diagram illustrating a system that is protected by a firewall according to an embodiment of the present invention. Firewall 100 monitors and analyzes the network traffic to and from network 106, and applies policies based on its analysis. One of the traffic flows includes data packets, such as 104 and 105, transferred between the Internet and device 102. The firewall intercepts the packet and identifies properties associated with the traffic. For the purposes of illustration, the following examples discuss in detail the identification of application protocol by a firewall. It should be also noted that similar techniques are also applicable for identifying other types of properties including user names, authentication state, encryption state, attachments, etc.

The beginning portion of a packet, known as the header, includes information regarding the addresses of the source and the destination, and the ports used for the application. According to the open system interconnection (OSI) model, the header information belongs to layers 1-4 defined by the OSI model.

Included in the packet's body portion is application data (also referred to as content data) specific to the application that is being executed. The application data belongs to layer 7 according to the current OSI model. To identify the protocol, the firewall invokes a pattern matching engine 108 to process the intercepted data. The pattern matching engine applies its pattern matching heuristic based on the pattern matching data selected from the packet. The pattern matching data refers to data associated with the traffic under analysis, used for pattern matching purposes. In one embodiment, it is the application data of one or more data packets. It may also be a subset of the application data, or include address and port information. The pattern matching engine is configured to be a part of the firewall in the embodiment shown; in other embodiments, the pattern matching engine may be a standalone process, a library, a part of an IDS, or any other appropriate hardware or software used for network traffic identification purposes. More details of the pattern matching engine are described in detail later.

Figure 2:
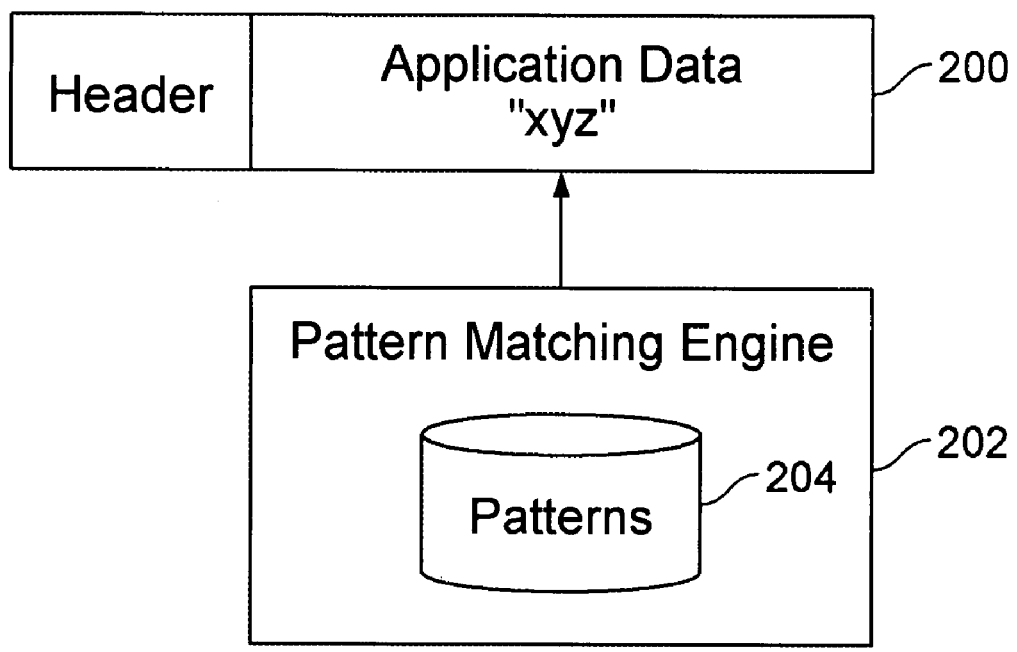
FIG. 2 is a diagram illustrating the identification of network traffic using pattern matching data accordingly to an embodiment of the present invention.

FIG. 2 is a diagram illustrating the identification of network traffic using pattern matching data according to an embodiment of the present invention. In this example, a networking data packet 200 is examined by a pattern matching engine 202. In this embodiment, the pattern matching data is selected by the pattern matching engine; in other embodiments, the pattern matching data may be selected by the firewall and sent to the pattern matching engine.

The pattern matching engine compares the pattern matching data with a set of patterns 204. A pattern can be used to identify a set of non-randomly occurring characters used by an application protocol. In one embodiment, a pattern is preferably distinctive in order to minimize incorrect identification. For example, a pattern used to locate the string "Gnutella connect" is more effective than a pattern used to locate the string "Gnutella" since the former is more distinctive. In some embodiments, several patterns can be used to identify a single protocol.

In one embodiment, the patterns also include the name of the application protocol being identified and its commonly used port. An example of a format for such patterns includes the following: <protocol>:<port>:<regex>. For example, a pattern used for identifying HTTP traffic can be defined as "HTTP:80:^POST/". Protocol includes the name of the application protocol, commonly represented as a symbolic string. In this case, the protocol is HTTP. Port can be an integer value for the most commonly used port by the protocol. It is preferably used as a reference only, since the actual port used by the protocol may be different. In the example shown, the commonly used port for HTTP is 80. Regex refers to a regular expression that defines the set of characters used in matching and determines how the matching is performed. There are many ways to define the regular expression. In the example shown, the regular expression has the same style as the regular expression used in the Perl programming language. The regular expression can also define the position anchor of the set of characters. For example, "^POST/" means to locate at the beginning of the application data a string that matches "POST". In some embodiments, the regular expression also determines the case sensitivity of the search, whether to ignore any white spaces, carriage returns and line breaks, etc.

The patterns may be stored within the pattern searching engine, on the network, or any other appropriate location that is accessible by the pattern search engine. In one embodiment, the pattern matching engine incorporates the Boost library, an open-source library for performing pattern search and analysis functions; in some embodiments, the pattern matching engine uses customized code to perform these functions. A pattern matching engine preferably has fast and efficient matching algorithms, and be flexible enough to define many types of searches.

Figure 3:
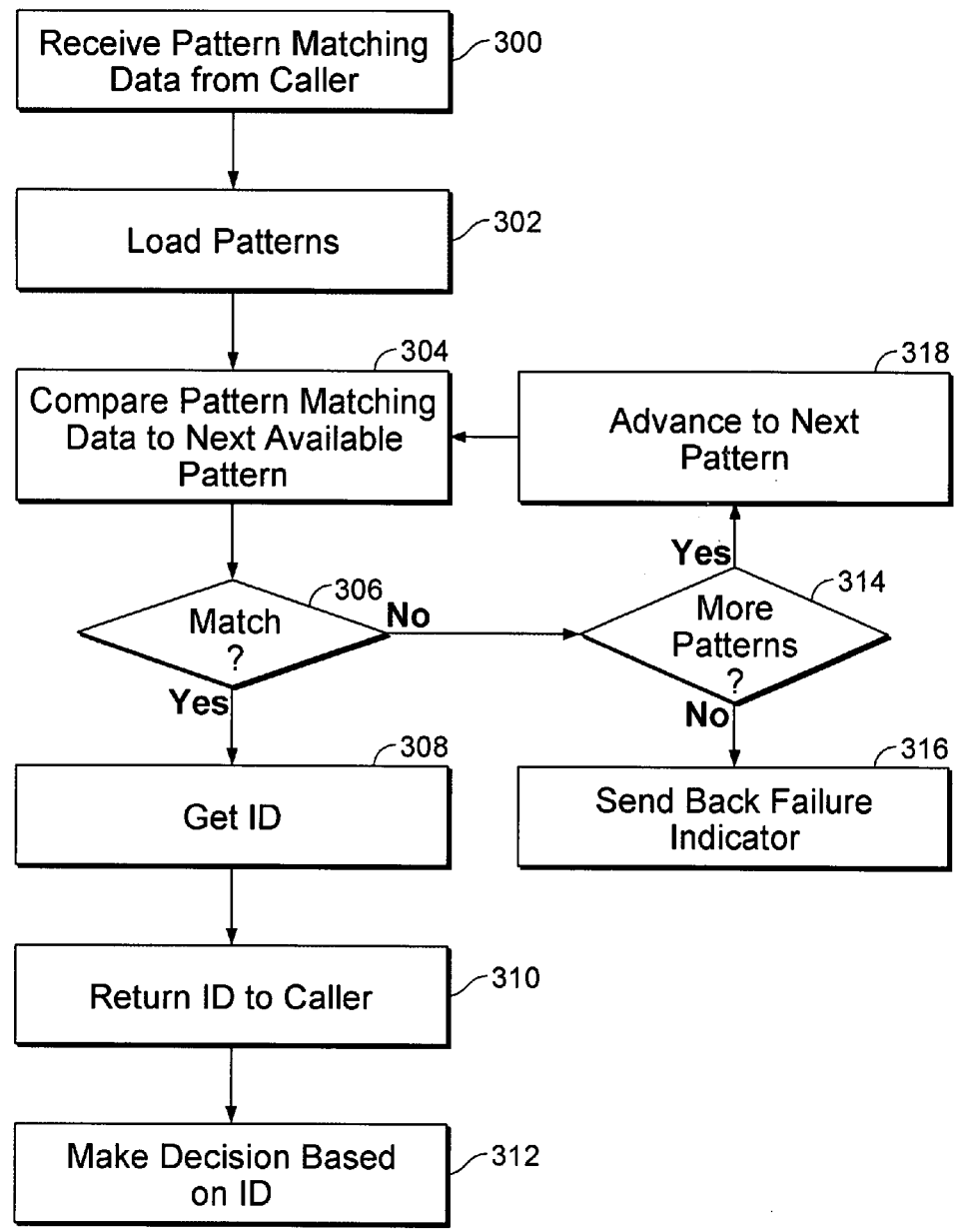
FIG. 3 is a flow chart illustrating the data identification process by the pattern matching engine according to one embodiment of the present invention.

FIG. 3 is a flow chart illustrating the data identification process by the pattern matching engine according to one embodiment of the present invention. In this example, the pattern matching engine is implemented as a library that is invoked by its caller application. The caller application, such as a firewall, receives the traffic data, decodes the header information and extracts the application data to provide pattern matching data. The pattern matching data is sent to the pattern matching engine to be processed.

Once the pattern matching engine receives the pattern matching data from the caller (300), it loads the patterns used for pattern matching into the engine's memory (302). The pattern matching engine then compares the pattern matching data to the next available pattern (304). If there is a match, then an identifier for the application protocol is obtained (308). The identifier is returned to the caller (310), which then makes its policy decision based on the identifier (312). If the pattern matching data does not match the pattern, it is then determined whether there are more patterns available for further determination (314). If no more patterns are available at this point, then the pattern matching engine has failed to find a match. A failure indicator is sent back to the caller (316). If, however, there are more patterns available, the pattern matching engine advances to the next pattern and control is sent to 304 where the application data is compared to the next available pattern, and the process is repeated again. In some embodiments, the patterns are sorted according to the likelihood of matching. In some embodiments, the patterns are sorted according to the importance of the corresponding protocol, where more important protocols are given higher priority in the list.

In the example shown above, the application protocol is determined once a single match is found. In some embodiments, the pattern matching data is compared with multiple patterns, and the results may include more than one match. The matched patterns are scored and the application protocol is determined according to the score.

Figure 4:
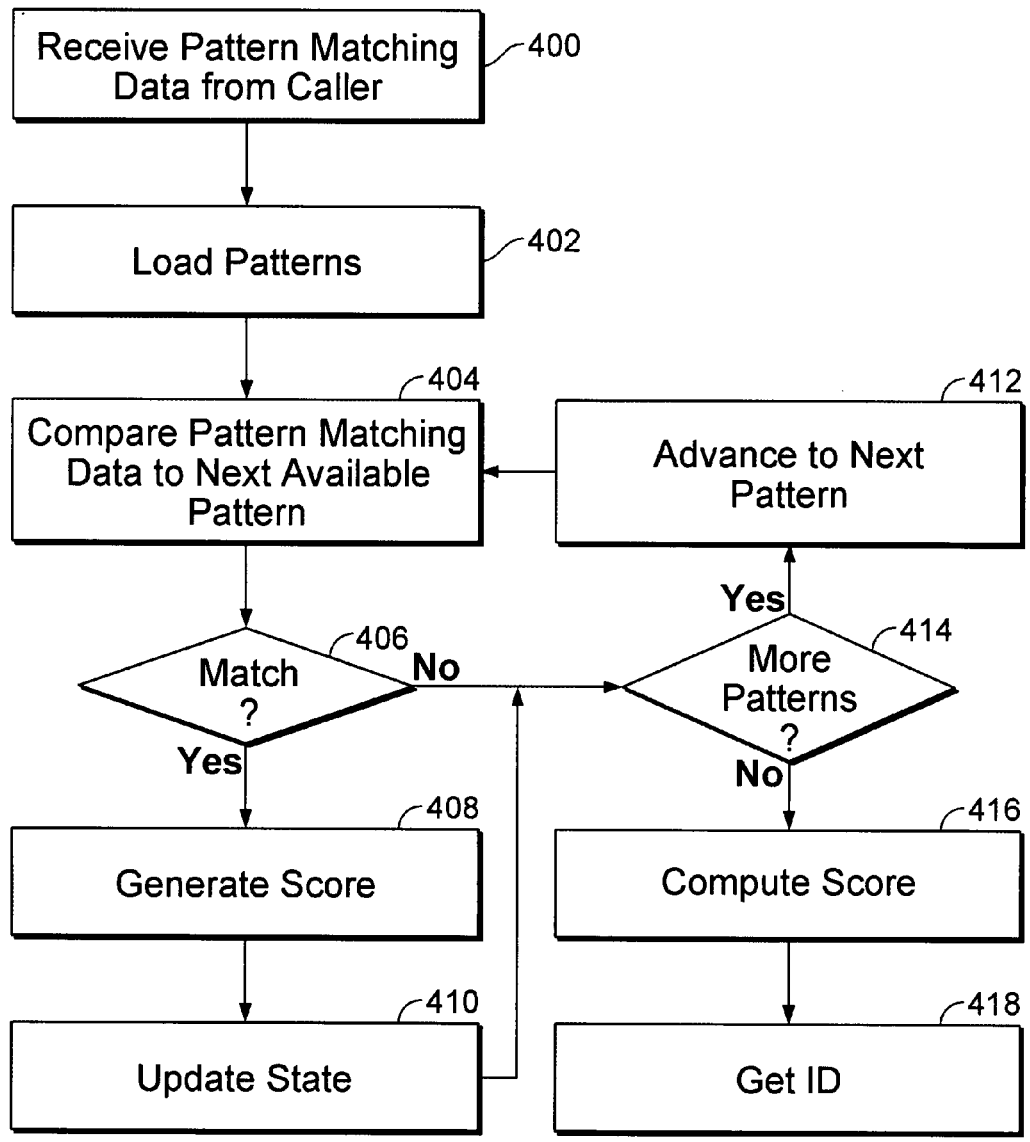
FIG. 4 is a flowchart illustrating the process for determining the application protocol based on multiple matches, according to one embodiment.

FIG. 4 is a flowchart illustrating the process for determining the application protocol based on multiple matches, according to one embodiment. In this example, the pattern matching data is received from the caller (400) and the patterns are loaded into the pattern matching engine (402). The pattern matching data is compared to the next available pattern (404). If there is a match, a score is generated based on the pattern (408). The score is generated based on a variety of factors including how well the pattern matching data matches the pattern, the importance of the property associated with the pattern, and any other appropriate criteria. The pattern matching engine includes a state that is used to track the score and the pattern associated with the score. The state is updated once the score is generated (410). Control is then transferred to step 414 wherein it is determined whether there are more patterns available for testing. If the pattern matching data is determined not to match the pattern (406), control is also transferred to step 414.

If it is determined that more patterns are available for testing, the pattern matching engine advances to the next pattern (412), and control is transferred to 404 where the pattern matching data and the next available pattern are compared again. If it is determined that all the patterns have been tested, then the score is computed (416), and an identifier is determined based on the score. In some embodiments the scores of the matches are weighed and compared to determine the most appropriate application protocol.

For example, a pattern search engine includes the following patterns:
    gnutella:6346:^GNUTELLA CONNECT
    gnutella:6346:^GNUTELLA OK
    gnutella:6346:^GIV .+:.+V.+
    smtp:25:^MAIL FROM.*
    smtp:25:^HELO.*

The corresponding weight of the patterns are 5, 2, 4, 5, 3, respectively. A set of pattern matching data matches the second, the fourth and the fifth patterns in the list. Accordingly, the computed score for Gnutella protocol is 2, and the score for SMTP protocol is 8. Thus, the application protocol is determined to be SMTP.

Sometimes, although the application data of one packet does not result in a match, it is possible to concatenate the application data from several packets to form a new set of pattern matching data that results in a match.

Figure 5:
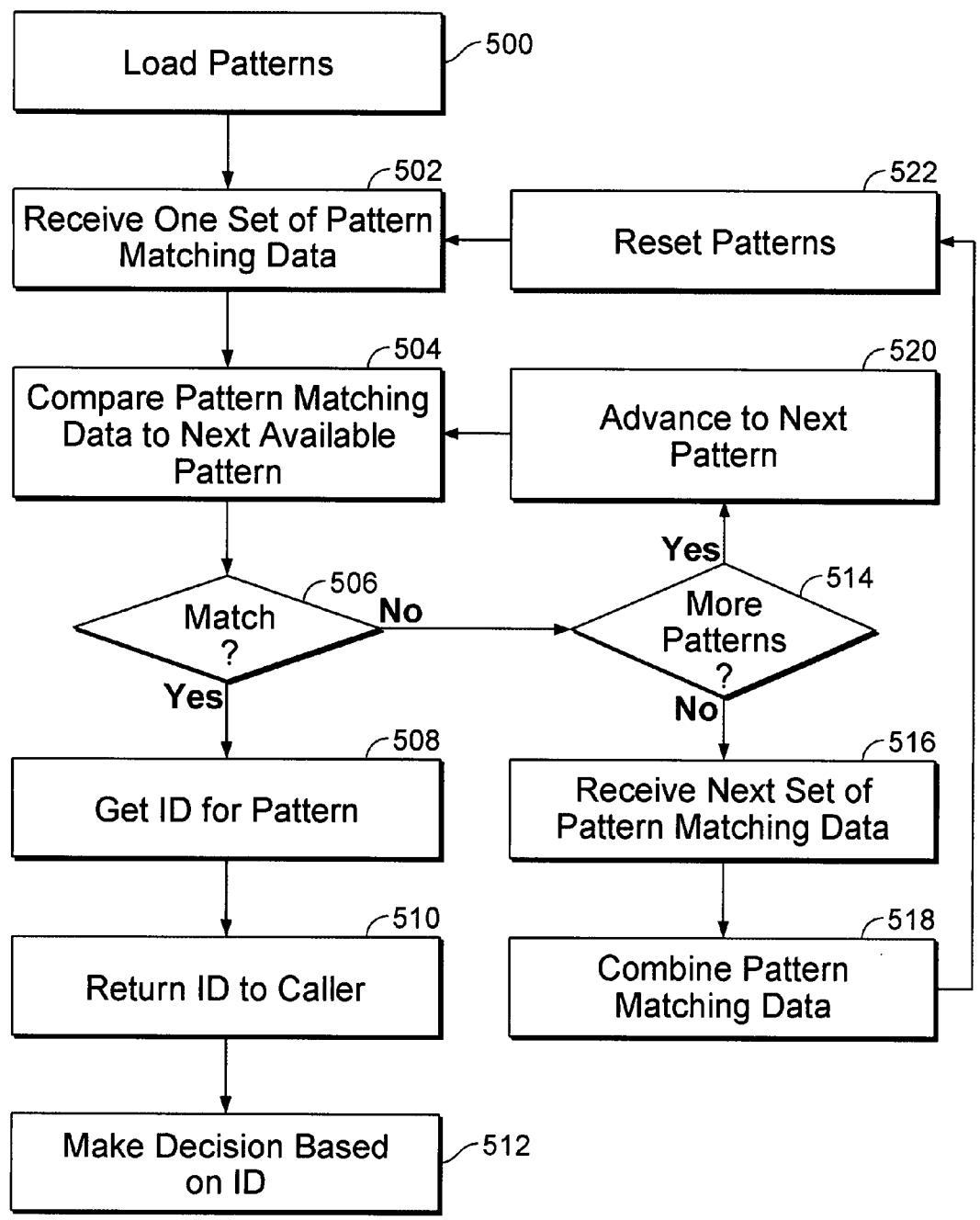
FIG. 5 is a flowchart illustrating a pattern matching process using concatenated data, according to one embodiment.

FIG. 5 is a flowchart illustrating a pattern matching process using concatenated data, according to one embodiment. Patterns are loaded by the pattern matching engine at the beginning of the process (500). The pattern matching data is received by the pattern matching engine (502), and compared to the next available pattern (504). If it is determined that there is a match, the identifier associated with the property of the pattern is retrieved (508) and the identifier is returned to the caller (510). Based on the identifier, the caller applies local policies to decide whether to allow the packet to pass (512). If a match is not found, it is then determined whether more patterns are available (514). If more patterns are available, the engine advances to the next pattern (520) and the pattern matching data is compared to the next pattern and the matching process is completed. If, however, no more patterns are available, the information from the next packet is received (516) and the new pattern matching data is combined with the existing pattern matching data (518). The combined pattern matching data is then sent to the pattern matching process. The patterns are reset (522) and control is transferred to step 504 where the matching process is repeated for the combined pattern matching data. The examples shown above process the patterns in a serial fashion. In some embodiments, the patterns are compared with the pattern matching data in parallel for improved efficiency.

Figure 6:
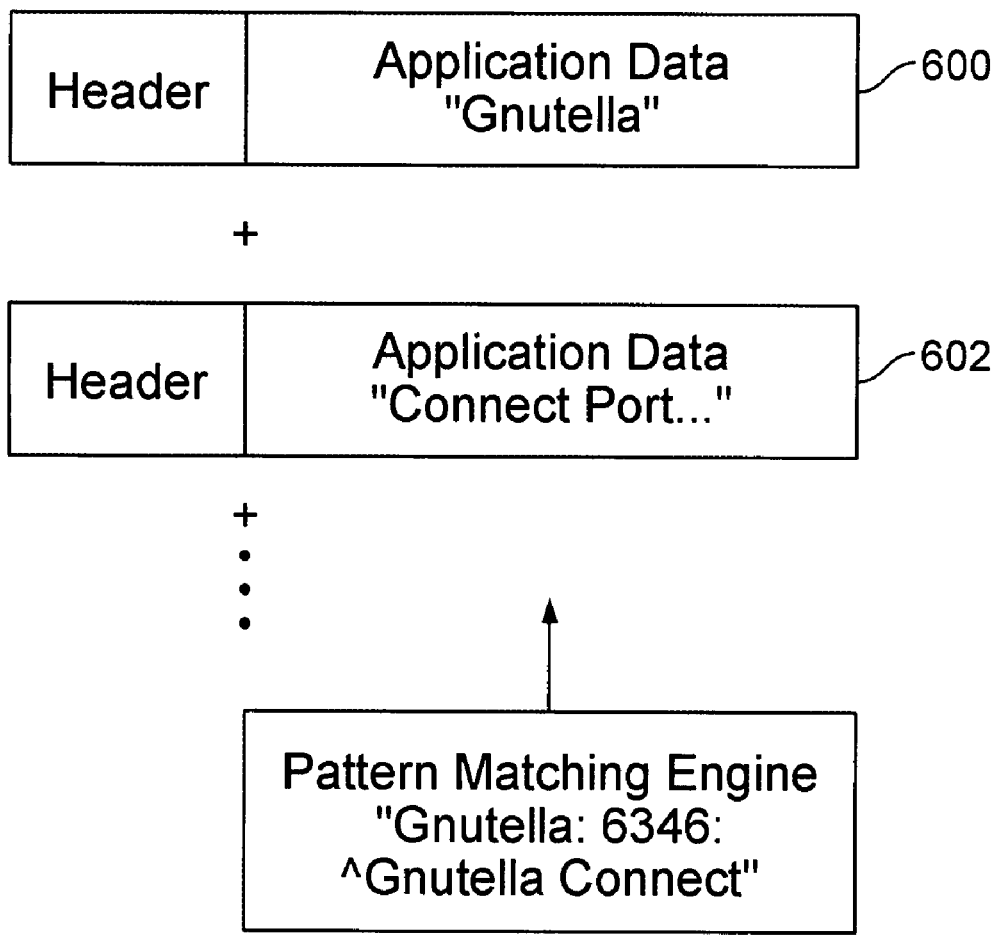
FIG. 6 is a block diagram illustrating pattern matching using multiple data packets according to an embodiment of the present invention.

FIG. 6 is a block diagram illustrating pattern matching using multiple data packets according to an embodiment of the present invention. FIG. 6 can be used in conjunction with the method shown in FIG. 5. In this example, the patterns used in the pattern matching engine is "gnutella:6346:^gnutella connect". Pattern matching data that starts with the string "gnutella connect" is identified as packets using the Gnutella protocol. Packet 600 only includes the string "gnutella" in its application data. Once it is determined that the packet does not match the pattern (506 of FIG. 5), and that there is no untested patterns (514), the pattern matching data of the next packet is retrieved (516). The pattern matching data of the next packet, packet 602, begins with the word "connect". It is concatenated with the pattern matching data of the previous packet to form new pattern matching data that begins with the string "gnutella connect" (518). When the matching process is repeated for the new pattern matching data (504), a match is found (506). In this example, the pattern matching engine concludes that the traffic is using Gnutella protocol.

In some embodiments, the pattern matching engine performs matching on the first several packets of a session to determine the application protocol. Such an approach is resource efficient. However, it gives opportunity for another type of exploit, where a disallowed application may spoof an allowed application protocol at the beginning of the session to evade detection, and then switch over to using the disallowed application protocol during the session. Thus, in some embodiments, the pattern matching engine performs matching throughout the session to continuously monitor the session and detect any changes in the application protocol.

An improved system and method for identifying network traffic have been disclosed. The resulting system is able to more accurately and efficiently identify properties such as application protocol.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A computer implemented method for identifying network traffic comprising:
    receiving pattern matching data at an interface;
    comparing the pattern matching data with each of a plurality of patterns using at least one computer;
    for each pattern, determining whether the pattern matching data matches the pattern;
    for each pattern that the pattern matching data is determined to match, including a pattern match score corresponding to the pattern in an application protocol score associated with an application protocol with which the pattern is associated, wherein the application protocol comprises one of a plurality of application protocols and each pattern is associated with a corresponding one of the plurality of application protocols; and
    concluding that a network traffic with which the pattern matching data is associated is associated with a determined application protocol that has a highest application protocol score among the plurality of application protocols.

2. The computer implemented method as recited in claim 1, wherein the pattern matching data includes application data.

3. The computer implemented method as recited in claim 1, in the event that the pattern matching data matches the pattern, further including determining a property associated with the network traffic.

4. The computer implemented method as recited in claim 1, in the event that the data matches the pattern, further including determining a property associated with the data and assigning a score for the property.

5. The computer implemented method as recited in claim 1, in the event that the data matches the pattern, further including determining a property associated with the data; and applying a policy based on the property.

6. The computer implemented method as recited in claim 1, wherein the pattern matching data includes a string selected from a packet.

7. The computer implemented method as recited in claim 1, wherein the pattern matching data includes concatenated application data of a plurality of packets.

8. The computer implemented method as recited in claim 1, wherein the pattern includes a regular expression.

9. The computer implemented method as recited in claim 1, wherein the pattern includes application protocol information.

10. The computer implemented method as recited in claim 1, wherein the pattern includes commonly used port information.

11. The computer implemented method as recited in claim 1, in the event the data does not match the pattern, further comprising returning a failure indicator.

12. The computer implemented method as recited in claim 1, wherein determining whether the pattern matching data matches the pattern is performed at the beginning of a session with respect to packets received at the beginning of the session.

13. The computer implemented method as recited in claim 1, wherein comparing the pattern matching data with a pattern is performed for each received data.

14. A system for identifying network traffic comprising:
an interface configured to receive pattern matching data; and
a processor configured to:
  compare the pattern matching data with each of a plurality of patterns;
  for each pattern, determine whether the pattern matching data matches the pattern;
  for each pattern that the pattern matching data is determined to match, include a pattern match score corresponding to the pattern in an application protocol score associated with an application protocol with which the pattern is associated, wherein the application protocol comprises one of a plurality of application protocols and each pattern is associated with a corresponding one of the plurality of application protocols; and
  conclude that a network traffic with which the pattern matching data is associated is associated with a determined application protocol that has a highest application protocol score among the plurality of application protocols.

15. The system as recited in claim 14, wherein the pattern matching data includes application data.

16. The system as recited in claim 14, wherein the processor is further configured to determine a property associated with the network traffic in the event that the pattern matching data matches the pattern.

17. The system as recited in claim 14, wherein the processor is further configured to determine a property associated with the data and assign a score for the property in the event that the data matches the pattern.

18. The system as recited in claim 14, wherein the processor is further configured to determine a property associated with the data and apply a policy based on the property in the event that the data matches the pattern.

19. The system as recited in claim 14, wherein the pattern matching data includes a string selected from a packet.

20. The system as recited in claim 14, wherein the pattern matching data includes concatenated application data of a plurality of packets.

21. The system as recited in claim 14, wherein the pattern includes a regular expression.

22. The system as recited in claim 14, wherein the pattern includes application protocol information.

23. The system as recited in claim 14, wherein the pattern includes commonly used port information.

24. The system as recited in claim 14, wherein the processor is further configured to return a failure indicator in the event the data does not match the pattern.

25. The system as recited in claim 14, wherein the processor is further configured to determine at the beginning of a session whether the pattern matching data matches the pattern.

26. The system as recited in claim 14, wherein the processor is configured to compare the pattern matching data with a pattern for each received data.

27. A computer program product for identifying network traffic, the computer program product being embodied in a tangible computer readable storage medium and comprising computer instructions for:
receiving pattern matching data;
comparing the pattern matching data with each of a plurality of patterns;
for each pattern, determining whether the pattern matching data matches the pattern;
for each pattern that the pattern matching data is determined to match, including a pattern match score corresponding to the pattern in an application protocol score associated with an application protocol with which the pattern is associated, wherein the application protocol comprises one of a plurality of application protocols and each pattern is associated with a corresponding one of the plurality of application protocols; and
concluding that a network traffic with which the pattern matching data is associated is associated with a determined application protocol that has a highest application protocol score among the plurality of application protocols.

28. The computer program product as recited in claim 27, wherein the pattern matching data includes application data.

29. The computer program product as recited in claim 27, further comprising computer instructions for determining a property associated with the network traffic in the event that the pattern matching data matches the pattern.

30. The computer program product as recited in claim 27, further comprising computer instructions for determining a property associated with the data and assigning a score for the property in the event that the data matches the pattern.

31. The computer program product as recited in claim 27, further comprising computer instructions for determining a property associated with the data; and applying a policy based on the property in the event that the data matches the pattern.

32. The computer program product as recited in claim 27, wherein the pattern matching data includes a string selected from a packet.

33. The computer program product as recited in claim 27, wherein the pattern matching data includes concatenated application data of a plurality of packets.

34. The computer program product as recited in claim 27, wherein the pattern includes a regular expression.

35. The computer program product as recited in claim 27, wherein the pattern includes application protocol information.

36. The computer program product as recited in claim 27, wherein the pattern includes commonly used port information.

37. The computer program product as recited in claim 27, further comprising computer instructions for returning a failure indicator in the event the data does not match the pattern.

38. The computer program product as recited in claim 27, wherein determining whether the pattern matching data matches the pattern is performed at the beginning of a session with respect to packets received at the beginning of the session.

39. The computer program product as recited in claim 27, wherein comparing the pattern matching data with a pattern is performed for each received data.

* * * * *

UNITED STATES PATENT AND TRADEMARK OFFICE
CERTIFICATE OF CORRECTION

PATENT NO. : 7,620,988 B1  Page 1 of 1
APPLICATION NO. : 10/628006
DATED : November 17, 2009
INVENTOR(S) : Brian Hernacki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1251 days.

Signed and Sealed this

Twenty-sixth Day of October, 2010

David J. Kappos
*Director of the United States Patent and Trademark Office*